US008659468B2

(12) United States Patent
Pujol et al.

(10) Patent No.: US 8,659,468 B2
(45) Date of Patent: Feb. 25, 2014

(54) METHOD OF CORRECTING REFLECTIVITY MEASUREMENTS BY ISOTHERM DETECTION AND RADAR IMPLEMENTING THE METHOD (75) Inventors: Olivier Pujol, Villeneuve d'Ascq (FR); Clémentine Costes, Plouzané (FR); Jean-Paul Artis, Plouzane (FR); Frédéric Mesnard, Lamarque-Pontacq (FR); Henri Sauvageot, La Barthe-Inard (FR); Alia Iassamen, Toulouse (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/118,697

(22) Filed: May 31, 2011

(65) Prior Publication Data
US 2012/0139779 A1 Jun. 7, 2012

(30) Foreign Application Priority Data

May 28, 2010 (FR) ...................... 10 02272

(51) Int. Cl.
*G01S 13/00* (2006.01)
(52) U.S. Cl.
USPC ..... 342/26 B; 342/26 R; 342/26 A; 342/26 C; 342/26 D
(58) Field of Classification Search
USPC ............................ 342/26 A, 26 B, 26 C, 26 D
See application file for complete search history.

(56) References Cited

U.S. PATENT DOCUMENTS

| 4,249,176 | A | * | 2/1981 | Oishi et al. ........................ 342/42 |
| 4,349,823 | A | * | 9/1982 | Tagami et al. ..................... 342/70 |
| 5,388,789 | A | * | 2/1995 | Rudershausen ............. 246/167 D |
| 5,572,449 | A | * | 11/1996 | Tang et al. ..................... 700/304 |
| 5,808,561 | A | * | 9/1998 | Kinoshita et al. ............. 340/903 |
| 5,850,176 | A | * | 12/1998 | Kinoshita et al. ............. 340/435 |
| 6,037,860 | A | * | 3/2000 | Zander et al. .................. 340/436 |
| 6,067,031 | A | * | 5/2000 | Janky et al. .................... 340/903 |
| 6,161,071 | A | * | 12/2000 | Shuman et al. ................. 701/48 |
| 6,201,494 | B1 | * | 3/2001 | Kronfeld ..................... 342/26 R |
| 6,268,804 | B1 | * | 7/2001 | Janky et al. .................... 340/903 |
| 6,487,500 | B2 | * | 11/2002 | Lemelson et al. ............. 701/301 |
| 6,516,262 | B2 | * | 2/2003 | Takenaga et al. ............... 701/96 |
| 6,741,203 | B1 | * | 5/2004 | Woodell ..................... 342/26 B |

(Continued)

OTHER PUBLICATIONS

Pujol O et al.: "Simulations of X band thunderstorm airborne radar observations", Atmospheric Research, Elsevier, Amsterdam, NL, vol. 93, No. 1-3, Jul. 1, 2007, pp. 310-316, XP026151600, ISSN: 0169-8095, sec. 1, 2, 4.1, 5, figures 1, 2, and 5.

(Continued)

*Primary Examiner* — Peter Bythrow
(74) *Attorney, Agent, or Firm* — Baker & Hostetler LLP (57) ABSTRACT A method of correcting the reflectivity measurements performed by a radar such as a weather radar, a reflectivity measurement being associated with a resolution volume includes analyzing the current resolution volume to determine whether the plane representing the 0° C. isotherm passes through it. When the plane representing the 0° C. isotherm passes through the current resolution volume, the volume is split into two parts lying on either side of said plane, the attenuation associated with the resolution volume is determined by taking into account the contribution of each of the parts to the measured reflectivity. The reflectivity associated with the current resolution volume is corrected using the attenuation thus determined. An onboard weather radar implements the method.

3 Claims, 7 Drawing Sheets (56) References Cited

U.S. PATENT DOCUMENTS

| | | | | |
|---|---|---|---|---|
| 6,810,321 | B1* | 10/2004 | Cook | 701/117 |
| 6,859,705 | B2* | 2/2005 | Rao et al. | 701/45 |
| 7,109,913 | B1* | 9/2006 | Paramore et al. | 342/26 B |
| 7,283,904 | B2* | 10/2007 | Benjamin et al. | 701/117 |
| 7,307,577 | B1* | 12/2007 | Kronfeld et al. | 342/26 B |
| 7,417,577 | B2* | 8/2008 | Testud et al. | 342/26 R |
| 7,444,240 | B2* | 10/2008 | Macneille et al. | 701/300 |
| 7,486,220 | B1* | 2/2009 | Kronfeld et al. | 342/26 B |
| 7,508,320 | B2* | 3/2009 | Taylor | 340/901 |
| 7,714,766 | B2* | 5/2010 | Costes et al. | 342/26 R |
| 7,714,767 | B1* | 5/2010 | Kronfeld et al. | 342/26 B |
| 8,050,855 | B2* | 11/2011 | Coy et al. | 701/119 |
| 8,098,188 | B2* | 1/2012 | Costes et al. | 342/25 R |
| 8,154,422 | B2* | 4/2012 | Hsu et al. | 340/903 |
| 8,165,776 | B2* | 4/2012 | Sugawara et al. | 701/96 |
| 8,212,712 | B2* | 7/2012 | Bon et al. | 342/26 R |
| 2002/0198660 | A1* | 12/2002 | Lutter et al. | 701/301 |
| 2003/0009275 | A1* | 1/2003 | Koike | 701/93 |
| 2003/0102997 | A1* | 6/2003 | Levin et al. | 342/57 |
| 2004/0230373 | A1* | 11/2004 | Tzamaloukas | 701/208 |
| 2005/0096825 | A1* | 5/2005 | Lee | 701/70 |
| 2007/0083318 | A1* | 4/2007 | Parikh | 701/96 |
| 2007/0103359 | A1* | 5/2007 | Testud et al. | 342/26 R |
| 2007/0109110 | A1* | 5/2007 | Ohmura et al. | 340/435 |
| 2007/0164896 | A1* | 7/2007 | Suzuki et al. | 342/70 |
| 2008/0040023 | A1* | 2/2008 | Breed et al. | 701/117 |
| 2008/0154629 | A1* | 6/2008 | Breed et al. | 705/1 |
| 2008/0161987 | A1* | 7/2008 | Breed | 701/27 |
| 2008/0288162 | A1* | 11/2008 | Theimer et al. | 701/117 |
| 2009/0243917 | A1* | 10/2009 | Bon et al. | 342/26 R |
| 2009/0289831 | A1* | 11/2009 | Akita et al. | 342/70 |
| 2010/0060482 | A1* | 3/2010 | Emam et al. | 340/905 |
| 2012/0133551 | A1* | 5/2012 | Pujol et al. | 342/26 R |
| 2012/0139779 | A1* | 6/2012 | Pujol et al. | 342/26 B |

OTHER PUBLICATIONS

Enrico Torlaschi et al.: "The Effect of Mean and Differential Attenuation on the Precision and Accuracy of the Estimates of Reflectivity and Defferential Reflectivity", J. Atmos. Oceanic Technology, vol. 20, No. 3, Mar. 2003, pp. 362-371, XP007917444, sec. 1 and 2.

Olivier Pujol et al.: "Degredation of Radar Reflectivity by Cloud Attenuation at Microwave Frequency", J. Atmos. Oceanic Technology, vol. 24, No. 4, Apr. 2007, pp. 640-657, XP0007917434, sec. 1, 5, figures 9, 12, and 14.

Sergey Y Matrosov et al.: "The Utility of X-Band Polarimetric Radar for Quantitative Estimates of Rainfall Parameters", Journal of Hydrometeorology, vol. 6, Jun. 1, 2005, pp. 248-262, XP007917430, ISSN: 1525-755X, sec. 1 and 2.

Melnikov V: "Validation of attenuation correction at X band performed with collocated S-band polarimetric radar", Oct. 5, 2009-Oct. 9, 2009, [Online] Oct. 5, 2009, pp. 1-9, XP007917425.

Robert Serafin Ed—Skolnik M I (Ed): "chapter 23, Meterological Radar", Jan. 1, 1990, Radar Handbook (2nd Edition), New York, NY: McGraw-Hill, US, pp. 23-1, XP007917427, ISBN:978-0-07-057913-2, sec. 23.3.

Anagnostou M N et al.: "Experimental results on rainfall estimation in complex terrain with a mobile X-band polarimetric weather radar", Atmospheric Research, Elsevier, Amsterdam, NL, vol. 94, No. 4, Dec. 1, 2009, pp. 579-595, XP026776662, ISSN: 0169-8095, DOI: Sec. 5.1, and 5.2.

Li W et al.: "Sensitivity of Dual-Frequency Rain DSD Retrieval to Particles in Melting Layer for Space-borne Radars", Geoscience and Remote Sensing Symposium, 2006. IGARSS 2006. IEEE Inter National Conference on, IEEE, PI, Jul. 1, 2006, pp. 507-510, XP031179013, sec. I, II, and IV.

Gaussiat, N. et al., "Cloud Liquid Water and Ice Content Retrieval by Multiwavelength Radar," Journal of Atmospheric and Oceanic Technology, 2003, vol. 20, pp. 1264-1275.

Gosset, M. et al., "Effect of Nonuniform Beam Filling on the Propagation of the Radar Signal at X-Band Frequencies. Part I: Changes in the k(Z) Relationship," Journal of Atmospheric and Oceanic Technology, Jul. 2001, vol. 18, pp. 1113-1126.

Iassamen, A. et al., "Distribution of Tropospheric Water Vapor in Clear and Cloudy Conditions from Microwave Radiometric Profiling," Journal of Applied Meteorology and Climatology, 2009, vol. 48, pp. 600-615.

Sauvageot, H., "Radar Meteorology," Artech House publisher, 1992, pp. 102-105.

Sauvageot, H. et al., "Radar Reflectivity of Cumulus Clouds," Journal of Atmospheric and Oceanic Technology, 1987, vol. 4, pp. 264-272.

* cited by examiner

METHOD OF CORRECTING REFLECTIVITY MEASUREMENTS BY ISOTHERM DETECTION AND RADAR IMPLEMENTING THE METHOD

CROSS-REFERENCE TO RELATED APPLICATIONS

This application claims priority to foreign French patent application No. FR 10 02272, filed on May 28, 2010, the contents of which are incorporated in their entirety herein by reference.

FIELD OF THE INVENTION

The invention relates to a method of correcting reflectivity measurements and to a radar implementing this method. It applies notably to the field of weather radars onboard aircraft, such as for example radars operating in the X band, i.e. the frequency (f) within which being close to 10 GHz. However, the invention is applicable at other frequencies.

BACKGROUND OF THE INVENTION

A weather radar transmits pulses of very short duration followed by listening time. The position and intensity of precipitation is estimated by analyzing the echoes of these pulses. This analysis is carried out, for example, on the basis of a measurement of the reflectivity level over the resolution volume of the radar.

There are components that cannot be detected using reflectivity measurements. These components are mainly cloud droplets, atmospheric gases and the effects due to the non-uniformity of filling of the radar resolution volume.

Liquid water clouds consist of microscopic spherical water droplets that are encountered at positive but also negative temperatures. In the latter case, they are in a meta-stable supercooled state observable down to −42° C. The droplets play an essential role in the physics of precipitating systems as they are involved in the formation and growth of precipitation, for example hail. The water droplets have a low reflectivity, of less than −15 dBZ as indicated in the article by H. Sauvageot and J. Omar entitled *Radar reflectivity of cumulus clouds*, Journal of Atmospheric and Oceanic Technology, vol. 4, pages 264-272, 1987. They are therefore undetectable by the radar because of reflectivity below the detectable signal, although they do significantly attenuate microwaves, in particular in the X band and at higher frequencies, as explained in the article by O. Pujol, J.-F. Georgis, L. Féral and H. Sauvageot entitled "*Degradation of radar reflectivity by cloud attenuation at microwave frequency*", Journal of Atmospheric and Oceanic Technology, vol. 24, pages 640-657, 2006.

Atmospheric gases are also undetectable by a radar and contribute to the attenuation of electromagnetic waves and therefore attenuation of the radar signal. In the frequency range in question, the attenuating gases are mainly dioxygen $O_2$ and water vapor $H_2O$, as indicated in the work by H. Sauvageot entitled "*Radar Meteorology*", Artech House Publisher, 1992. Dioxygen has two absorption bands centered around 60 and 119 GHz. As for water vapor, this has two absorption bands with central frequencies approximately located at 22 and 183 GHz. It follows that these gases affect the propagation of microwaves, especially those in the X band.

The homogeneity of the target in the resolution volume is an implicitly accepted assumption in radar observations and in the algorithms conventionally used for correcting attenuation.

The measured reflectivity $Z_m$, expressed in $mm^6 \times m^{-3}$, of a resolution volume $V_r$ centered on a point M may be expressed by the following equation:

$$Z_m(r) = Z(r)\exp\left\{\ln 10 \times \left[-0,2\int_0^r k(s)ds\right]\right\} \quad (1)$$

in which:
r is the distance expressed in km between the point M and the radar;
k denotes the specific attenuation expressed in $dB \cdot km^{-1}$; and
$Z(r)$ is the unattenuated reflectivity at the distance r, also called the true reflectivity and expressed in $mm^6 \times m^{-3}$, which term contains useful information for the detection.

The specific attenuation k has three contributions: that of precipitations, that of cloud droplets and that of atmospheric gases. The first contribution can be calculated directly since precipitations are detectable, and does not form the subject matter of the first part of this patent. This first contribution will therefore be omitted in the rest of the discussion relating to the non-detectable components. However, it is of course taken into consideration later (in the second part of the patent).

In equation (1) the specific attenuation k depends on the distance r between M and the radar. No information about the geometry of the resolution volume $V_r$ is involved in this equation. To be precise, k is an average specific attenuation in $V_r$. It follows that the measured reflectivity $Z_m$ is also a quantity which is smooth over the resolution volume in question. This smoothing effect necessarily has an influence on the attenuation correction and introduces a bias in the measurements. This situation is not taken into account in a simple manner in the solutions of the prior art. It is very difficult to correct it as what is measured remains a value smooth over a resolution volume. On account of the 3 dB aperture of the beam of an onboard radar, this aperture being for example equal to 4°, the resolution volume may be very large. Thus, at some 150 km away, its vertical extension amounts to about 10 km, so that, at average latitudes, the resolution volume contains the entire troposphere. The non-uniform filling of the resolution volume is then the general case. It may therefore be seen that this non-uniformity becomes a problem for observations at moderate and large distances.

Exploitation of the radar signal, in particular for estimating, remotely, and realistically, the hazardousness of a precipitating system, requires the attenuation due to the aforementioned causes to be optimally corrected so as to obtain a value of the reflectivity as close as possible to the actual reflectivity.

The attenuation by cloud droplets is considerable if the electromagnetic wave propagates within a precipitating system. This is for example the case for observations of convective cells embedded in an extended stratiform background. Likewise, observation of two convective cells aligned along the radial radar direction necessitates, in order to assess the hazardousness of the situation, correcting the attenuation by the undetectable component, represented by the cloud droplets. Thus, a hazard associated with an observed precipitating system may be underestimated, in particular when the radar operates in the X band and at higher frequencies.

Correcting the attenuation due to cloud droplets would be easy if they could be detected directly or even indirectly. Several indirect methods have been developed in this regard. A first method consists in using a dual-frequency radar, that is to say in making two observations located at the same point in the time space at different frequencies (Gosset and Sauvageot 1992). For example, the 10 GHz/35 GHz frequency pair is suitable for this. However, such technique is not free of ambiguity in the measurements, such as those associated with the confusion between non-Rayleigh effects and the attenuation. Furthermore, it is difficult to implement this technique for airborne radars that operate at a single frequency, especially for space requirement reasons.

An alternative approach enabling the non-Rayleigh ambiguity to be eliminated is based on the use of three frequencies, as explained in the article by N. Gaussiat, H. Sauvageot and A. J. Illingworth entitled "*Cloud liquid water and ice content retrieval by multi-wavelength radar*", Journal of Atmospheric and Oceanic Technology, Vol. 20, pages 1264-1275, 2003. This mechanism is technically sophisticated, and even less realistic as regards airborne radars.

Thus, at the present time, in the context of radars operating at a single frequency, such as for example airborne radars, there is no exploitable method for correcting the attenuation of microwaves due to cloud droplets.

The attenuation by atmospheric gases can be neglected only for short-range observations, such not being the case, for example, in the context of civil aviation as a pilot must ascertain the meteorological hazard at distances in excess of 100 km.

The non-uniformity of the resolution volumes may itself be neglected for short-range observations and small apertures of the radar beams. Here too, this is not the case in civil aviation: the radars used have relatively large 3 dB apertures, for example 4°, and the information sought by the pilot is at least a few 100 km away from the aircraft.

SUMMARY OF THE INVENTION

One object of the invention is notably to remedy the aforementioned drawbacks.

For this purpose, an embodiment of the invention is a method of correcting the reflectivity measurements performed by a radar such as a weather radar, a reflectivity measurement being associated with a resolution volume. The method comprises at least:
- a step of acquiring the reflectivity measurement $Z_m(i)$ corresponding to the current resolution volume;
- a step of estimating the attenuation $k_c$ introduced by the cloud droplets, said estimating being carried out by using an average vertical profile of the cloud liquid water content;
- a step of estimating the attenuation $k_{g,O_2}$ introduced by dioxygen;
- a step of estimating the attenuation $k_{g,H_2O}$ introduced by the water vapor;
- a step of determining the total specific attenuation k due to the non-detectable components taking into account the attenuation $k_c$, the attenuation $k_{g,O_2}$ and the attenuation $k_{g,H_2O}$ estimated in the preceding steps; and
- a step of correcting the measured reflectivity taking into account the estimated total specific attenuation k.

According to an embodiment of the invention, the attenuation $k_c$ introduced by the cloud droplets is estimated by applying an average vertical profile of the cloud liquid water content.

The cloud water content $M_n$ is determined, for example, using the following vertical profile:

$$M_n(i) = 10^{\{a_1^m \times T(i) - a_2^m\}}$$

in which:
$M_n$ represents the cloud water content expressed in $g \cdot m^{-3}$;
T represents the temperature expressed in °C.;
$10^{\{\}}$ represents the power function of 10; and
$a_1^m$ and $a_2^m$ are known parameters that depend on the weather conditions in the geographic location.

The attenuation $k_c$ is deduced, for example, from the value of $M_n$ estimated using the expression:

$$k_c(i) = a \times M_n(i)$$

in which a has a real value dependent on the temperature.

The specific attenuation due to dioxygen is estimated, for example, using the expression:

$$k_{g,O_2}(i) = C_1 \times p(i)^2$$

in which:
$C_1$ is a constant chosen according to the geographic location and the season; and
p(i) represents the pressure.

The specific attenuation due to water vapor is estimated, for example, using the expression:

$$k_{g,H_2O}(i) = C_2 \times p(i) \times M_v(i)$$

in which:
$C_2$ is a constant chosen according to the geographic location and the season; and
$M_v$ represents the water vapor content.

The pressure field is estimated, for example, using a decreasing function of the pressure with the altitude of the standard atmosphere.

The water vapor content $M_v$ is estimated, for example, using a standard vertical profile of the water vapor content defined by the expression:

$$M_v(i) = \frac{A_1}{T + 273.15} \exp\left(A_2 \times \frac{T(i)}{T - A_3}\right)$$

in which the coefficients $A_1$, $A_2$ and $A_3$ are average values obtained from radiometric measurements chosen according to the weather conditions.

The total specific attenuation in a resolution volume n is estimated, for example, using the following expression:

$$k(n) = k_c(n) + k_g(n)$$

in which:
$k_g(n)$ represents the sum of the estimates $k_{g,O_2}$ and $k_{g,H_2O}$ in the nth resolution volume.

Another embodiment of the invention is a method of correcting the reflectivity measurements performed by a radar such as a weather radar, a reflectivity measurement being associated with a resolution volume. The current resolution volume is analyzed so as to determine whether the plane representing the 0° C. isotherm passes through it. When the plane representing the 0° C. isotherm passes through the current resolution volume, said volume is split into two parts lying on either side of said plane, the attenuation associated with the resolution volume is determined by taking into account the contribution of each of the parts to the measured reflectivity. The reflectivity associated with the current resolution volume is corrected using the attenuation thus determined.

According to an embodiment of the invention, the attenuation, for precipitation, is determined using the expression:

$$k = a \times (1-\alpha)^b \times (Z_m)^b + a' \times \alpha \times (Z_m)^{b'}$$

in which a, b, a' and b' are real constants to be chosen according to the weather conditions and the type of precipitation.

Another subject of the invention is a weather radar on board an aircraft, characterized in that it includes means for implementing at least one of the methods as described above.

BRIEF DESCRIPTION OF THE DRAWINGS

Other features and advantages of the invention will become apparent from the following description, given by way of non-limiting illustration and in conjunction with the appended drawings in which.

DETAILED DESCRIPTION

Figure 1:
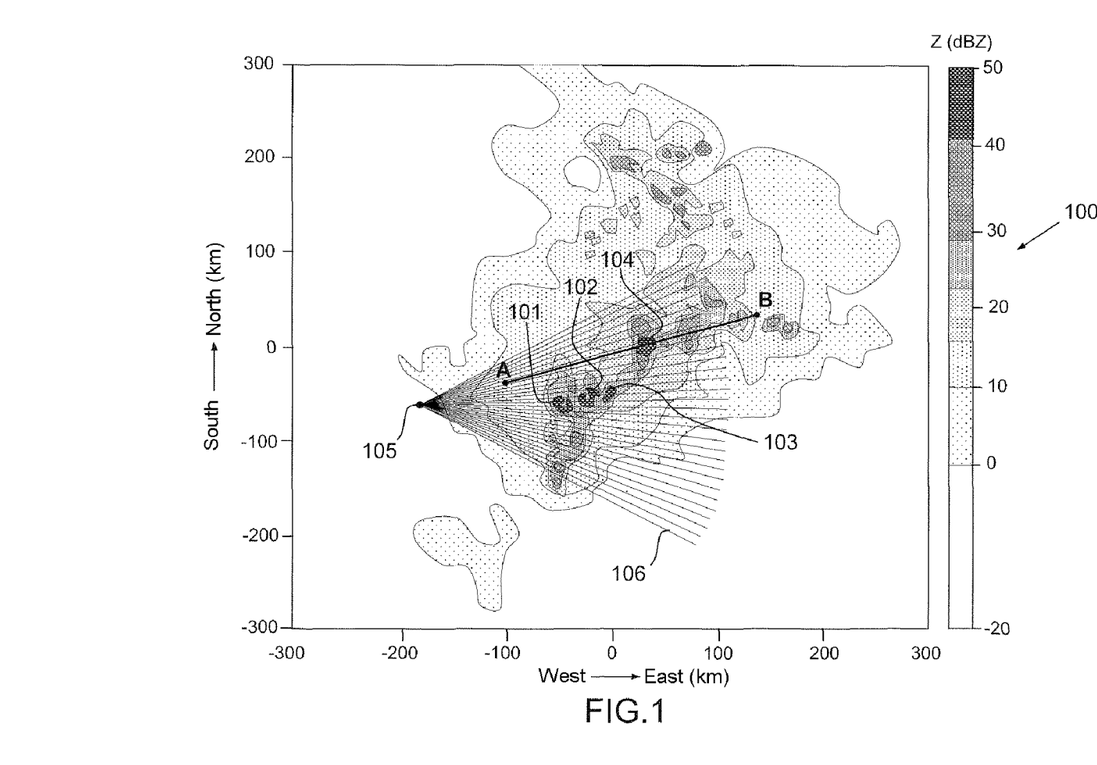
FIG. 1 gives an example of an S-band radar image of a squall line extending over about 200 km.

FIG. 1 gives an example of an S band (f=3 GHz) radar image of a squall line extending over around 200 km. A radar image is made up of pixels, each of them being associated with a resolution volume with which a radar measurement is associated. These pixels are usually colored, and their color corresponds for example to a reflectivity level. The colored radar image generated thus makes it possible for the presence of precipitation to be visually discerned. Since FIG. 1 is in black and white, the reflectivity level is not shown in color but according to a gray scale 100, the principle remaining the same.

The S band is hardly attenuated so that it constitutes a good reference. The presence of convective cells 101, 102, 103, 104 of high reflectivity, greater than 40 dBZ, indicates the possible presence of hail and therefore attests to the hazardousness of this system. An X band radar 105 is positioned on the image. A line 106 corresponds to a radial line, i.e. a line in a direction in which the antenna points. The X band microwaves, when observing along the radial line defined by the direction AB, will be attenuated, not only by any precipitation, but also by atmospheric gases and cloud droplets present in the convective cells and the stratiform region (Z<25 dBZ). The hazard will therefore be underestimated if attenuation due to these undetectable components is not taken into account.

Figure 2:
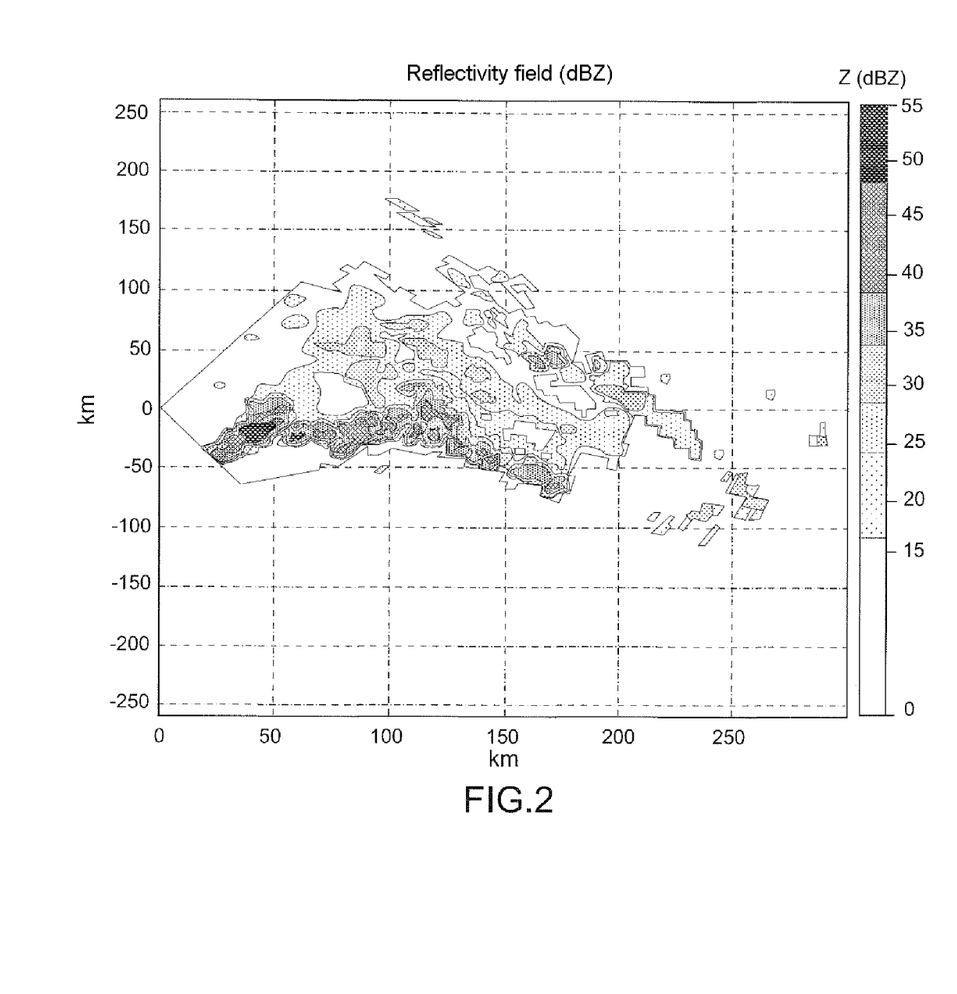
FIG. 2 gives an example of the reflectivity in the X band measured by an airborne radar in the presence of the squall line shown in FIG. 1.

FIG. 2 gives an example of the reflectivity measured, in the X band, by an airborne radar in the presence of the squall line shown in FIG. 1.

As explained above, the undetectable components introduce an error leading notably to an underestimate of the hazard associated with a precipitating system.

The invention advantageously enables the measured reflectivity to be corrected by estimating the attenuation due to the cloud droplets on the one hand and to the atmospheric gases, such as dioxygen ($O_2$) and water vapor ($H_2O$), on the other, and also by taking into account the lack of homogeneities in the resolution volumes.

This correction may be performed using, for example, an equation derived from equation (1) obtained by considering the logarithmic form of the quantities in this equation:

$$10 \times lg(Z_m) = 10 \times lg(Z) - 2 \times \int_0^r k(s) ds \qquad (2)$$

Expressing $10 \times lg(Z_m)$ as $Z_m^{dBZ}$ and $10 \times lg(Z)$ as $Z^{dBZ}$, equation (2) becomes:

$$Z_m^{dBZ} = Z^{dBZ} - 2 \times \int_0^r k(s) ds \qquad (3)$$

$Z_m^{dBZ}$ and $Z^{dBZ}$ being expressed in dBZ while $Z_m$ and $Z$ were expressed in $mm^6 \times m^{-3}$.

In discretized form, if i denotes the index of a pixel along a radial direction, that is to say along a line of sight of the radar (a given direction in which the antenna points), the following equation may be used to obtain the true reflectivity Z(i) from the measured reflectivity $Z_m(i)$:

$$Z^{dBZ}(i) = Z_m^{dBZ}(i) + 2 \times \Delta r \times \sum_{n=1}^{i-1} k(n) \qquad (4)$$

in which:
$\Delta r$ is the distance between two consecutive pixels;
k(n) is the specific attenuation.
The second term on the right of the equals sign corresponds to the cumulative attenuation along the direction of sight for a round-trip journey, which explains the presence of the factor 2.

For undetectable components (clouds, gases), the estimated specific attenuation k(n) in the current nth resolution volume along the line of sight may be decomposed using the following equation:

$$k(n) = k_c(n) + k_g(n) \qquad (5)$$

in which:
$k_c(n)$ is the contribution to the specific attenuation due to the cloud droplets; and
$k_g(n)$ is the contribution to the specific attenuation due to the gases (dioxygen and water vapor).
Consequently, once the contributions to the specific attenuation due to the undetectable components has been estimated, the measured reflectivity may be corrected thereby.

Figure 3:
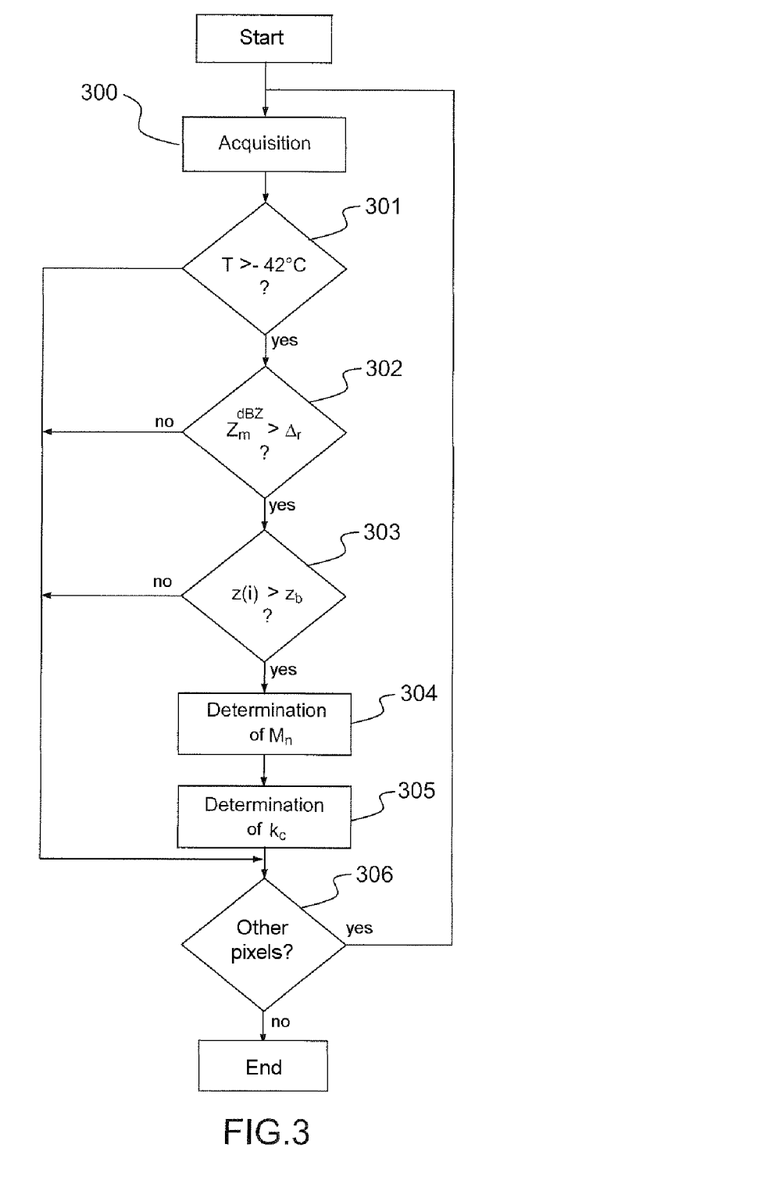
FIG. 3 gives an example of a method for estimating the attenuation due to the cloud droplets.

FIG. 3 gives an example of a method for estimating the attenuation due to the cloud droplets.

The objective of the first step is the acquisition 300 of data, notably to measure the reflectivity $Z_m^{dBZ}(i)$ for the resolution volume being processed, called in the rest of the description the current resolution volume, and its altitude z(i).

The procedure then checks whether three conditions are fulfilled. If one of these conditions is not validated, this means that there cannot be cloud droplets. It is then unnecessary to calculate $k_c$.

Cloud droplets are necessary in order for precipitation to occur. Consequently, a precipitating system detectable using reflectivity measurements is necessarily associated, in altitude, down to temperatures above −42° C., with a generator cloud, i.e. an undetectable component using reflectivity measurements. The first condition 301 to be verified is therefore that the temperature T in the resolution volume is above −42° C.

The second condition 302 to be verified is that the measured reflectivity $Z_m^{dBZ}$ exceeds a chosen threshold value $\Delta_r$. For example, this threshold may be chosen such that $\Delta_r=0$ dBZ.

The third condition to be verified is that the altitude z(i) at the center of the current resolution volume is above a calculated altitude $z_b$. This altitude $z_b$ corresponds to the base of the clouds and is called, in the rest of the description, the base altitude. This is determined beforehand for each climatic region and each season, for example on the basis of a statistical climatic average deduced from a reanalysis database used for forecast models. An example of a database that can be used for this purpose is a data base containing the reanalysis for the ECMWF ERA 40 model, ECMWF being the acronym for European Centre for Medium Range Weather Forecasting. It is also possible to use outputs from actual models and weather information deduced, for example, from radiosondes or onboard instruments.

Thus, step 303 verifies that $z(i) \geq z_b$. If this is the case, the third condition is verified and a succession of steps 304, 305 resulting in an estimate of the attenuation $k_c$ is applied.

The principle of determining the attenuation $k_c$ is based on the use of an average vertical profile of the cloud liquid water content $M_n$, where $M_n$ corresponds to the total mass of cloud droplets, excluding raindrops and other hydrometeors, in one cubic meter of dry air. This average vertical profile may be determined as described below.

The shape of the vertical profile of $M_n$ is an average shape derived from statistics collected over a large number of geographic sites, for example using multichannel microwave radiometric profilers and measurements by instrumented aircraft.

This profile may be chosen such that it depends only on the temperature T, the temperature playing the role of vertical coordinate.

Thus, a step 304 of the method determines a value of $M_n(i)$ corresponding to the pixel i.

To determine $M_n(i)$, it is then possible for example to use an equation of the form:

$$\lg[M_n(i)] = a_1^m \times T(i) - a_2^m \quad (6)$$

in which:

$M_n(i)$ represents the cloud liquid water content expressed in g·m$^{-3}$ for the pixel i;

$a_1^m$ and $a_2^m$ are known parameters that are dependent on the weather conditions, for example for average continental latitude regions: $a_1^m \approx 0.023$ and $a_2^m \approx 0.920$;

T(i) represents the temperature expressed in degrees Celsius (° C.) for the pixel i; and lg( ) represents the logarithmic function in base 10.

Thus, to obtain $M_n(i)$ directly, it is sufficient to apply the following equation:

$$M_n(i) = 10^{\{a_1^m \times T(i) - a_2^m\}} \quad (7)$$

To avoid aberrant values of $M_n$, it is judicious to restrict the application of equation 7 to temperatures below a certain value, for example 10° C., this value often being that for which the cloud liquid water content is a maximum. Above this threshold temperature, it may be assumed that the cloud liquid water content is constant, equal to its value for T=10° C.

The vertical integral over T of the $M_n$ profile is constrained to verify the integrated value derived from the reanalysis database at each point on the globe or, more precisely, for each climatically homogeneous area. Thus, to determine the values of $M_n$ for various altitudes, a temperature profile T may be used. This profile may be derived from databases obtained from radiosondes or satellite profiles. If this type of data is not available, it may be considered that, inside the detectable cloud, there is a linear decrease in the temperature equal to the moist adiabatic gradient dT/dz=−6.5° C.km$^{-1}$, the ground temperature having to be chosen according to the weather situation, the season and the location.

Since the attenuation $k_c$ of the pixel i is proportional to $M_n(i)$, it can be obtained in step 305 using the following equation:

$$k_c(i) = a \times M_n(i) \quad (8)$$

in which a has a real value dependent on the temperature. Thus, in the X band, the following values of a may advantageously be chosen:

$a = 11.2 \times 10^{-2}$ if −42° C. $\leq$ T<0° C.;
$a = 8.58 \times 10^{-2}$ if 0° C. $\leq$ T<10° C.;
$a = 6.30 \times 10^{-2}$ if 10° C. $\leq$ T<20° C.;
$a = 4.83 \times 10^{-2}$ if T$\geq$20° C.

In step 306, if there are other pixels to be processed, and therefore the attenuation $k_c(i)$ has to be calculated for the resolution volumes that are associated therewith, the steps described above are applied again for this purpose.

Figure 4:
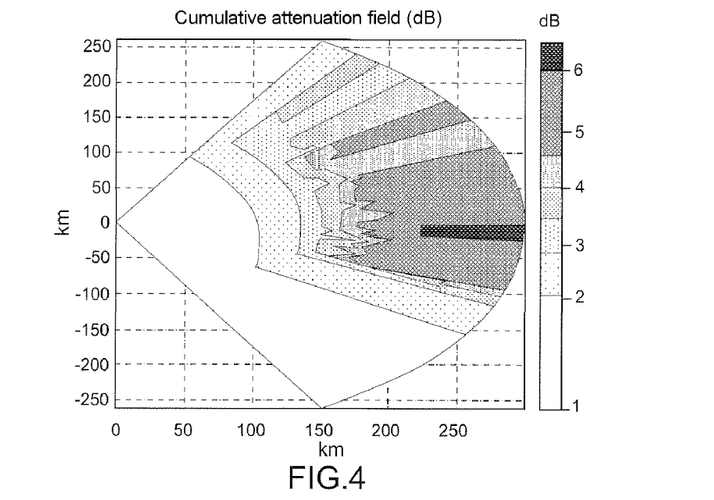
FIG. 4 represents the cumulative X band attenuation field due to the cloud droplets.

FIG. 4 shows the cumulative attenuation, in the X band, due to the cloud droplets for the case of the system shown in FIG. 2.

It may be seen that the attenuation may exceed 3 dB for distances greater than 150 km, even reaching 6 dB, at the end of the radial line. These values are significant and advantageously considered in the attenuation correction method according to the invention.

As regards the atmospheric gases $O_2$ and $H_2O$, the attenuation depends on the temperature T, on the atmospheric pressure p expressed in atmospheres and on the water vapor content $M_v$ expressed in g·m$^{-3}$. It is also possible to express the specific attenuation due to these gases, for the pixel $i_j$, using the following equations:

$$k_{g,O_2}(i) = C_1 \times p(i)^2 \quad (9)$$

$$k_{g,H_2O}(i) = C_2 \times p(i) \times M_v(i) \quad (10)$$

in which $C_1$ and $C_2$ are constants, to be chosen according to the weather conditions, but are influenced by the temperature. Further information regarding these models may be found in the book by H. Sauvageot entitled *Radar Meteorology*, Artech House Publisher, 366 pages, 1992.

The pressure, temperature and water vapor content fields are not known with any precision at any instant and at any point in the atmosphere.

In the case of dioxygen, the coefficients, such as the abovementioned attenuation constant $C_1$, are considered to be standard.

In addition, to calculate the attenuation correction the pressure field has to be known. To do this, it is possible to use, for example, the decrease in pressure with the altitude of the standard atmosphere. In other words the pressure p(i) associated with the pixel i may be expressed using the following equation:

$$p(i) = p_{ground} \times \exp\left[\frac{z(i)}{H}\right] \quad (11)$$

in which:

$p_{ground}$ represents the pressure at ground level;

z(i) represents the altitude of the ith pixel; and

H corresponds to the height scale, this representing the altitude, starting from ground level, at which the relative pressure variation with respect to the ground $\Delta p/p_{ground}$ is equal to 1/e: for z=H and $\Delta p/p_{ground}$=1/e, H is equal to 8.3 km.

The attenuation $k_{g,O_2}$ corresponding to dioxygen can then be determined using equation (9).

In the case of water vapor, in clear air, a similar methodology is adopted, namely that with reference to the pressure in the standard atmosphere. In addition to the coefficients such as the abovementioned attenuation constant $C_2$, a standard vertical profile of the water vapor content is used. To calculate it, the equations given in the article by A. Iassamen, H. Sauvageot, N. Jeannin and S. Ameur entitled *Distribution of tropospheric water vapor in clear and cloudy conditions from microwave radiometric profiling*, Journal of Applied Meteorology, vol. 48, pages 600-615, 2009 may for example be used. These equations are then used by making it a distinction between the case of clear air (not saturated with vapor) and the case of clouds and precipitation (saturated vapor), in which the reflectivity is not zero. These equations are of the form:

$$M_v(i) = \frac{A_1}{T+273.15}\exp\left(A_2 \times \frac{T(i)}{T-A_3}\right) \quad (12)$$

in which the coefficients $A_1$, $A_2$ and $A_3$ are average values obtained from radiometric measurements chosen according to the weather conditions and the temperature T is expressed in degrees Celsius (° C.).

The attenuation $k_{g,H_2O}$ corresponding to water vapor can then be determined using equation (10) for which all the terms have been estimated.

Figure 5:
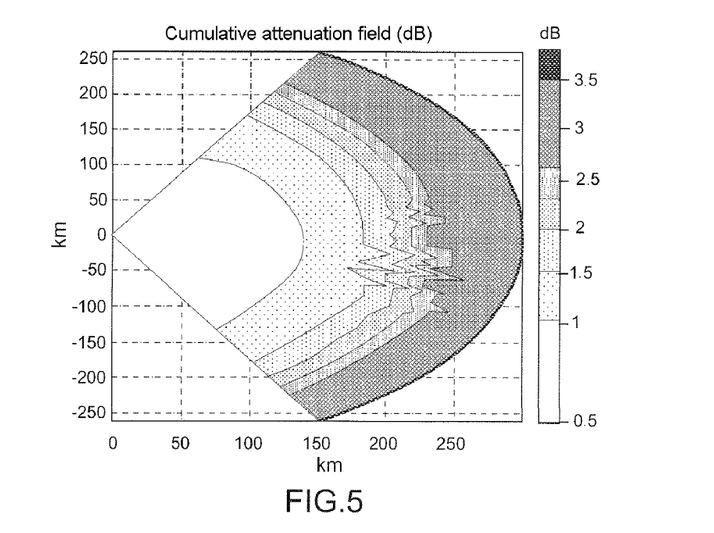
FIG. 5 shows the cumulative attenuation field due to the atmospheric gases.

FIG. 5 shows the cumulative attenuation field due to the atmospheric gases, calculated as indicated above. It shows that cumulative attenuations ranging up to more than 3 dB may be achieved, over the round trip of the radar signal, for propagations over large distances.

Of course, the methods presented here in the X band may be readily adapted to other frequencies used by onboard radars.

Figure 6:
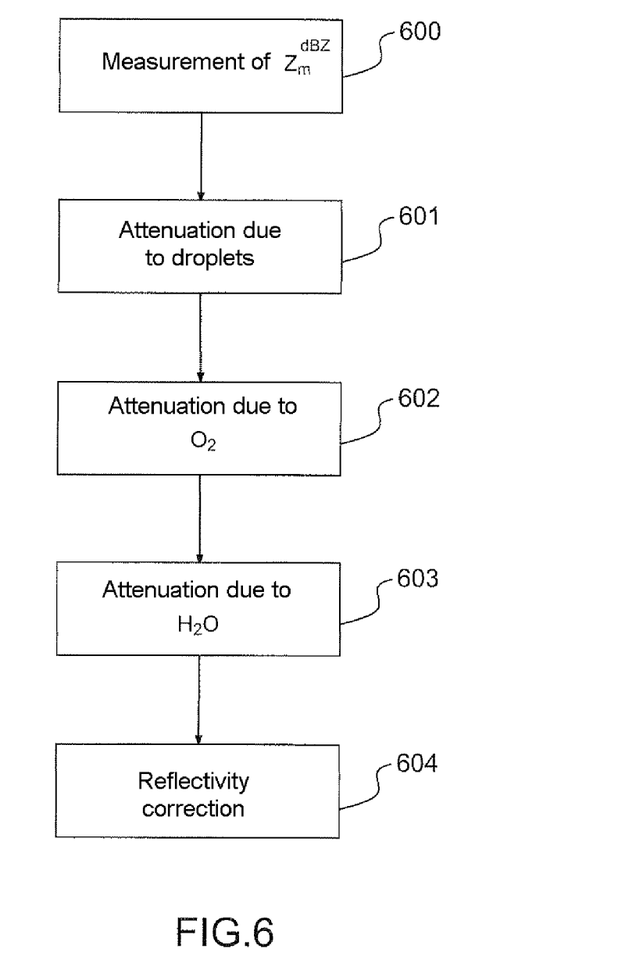
FIG. 6 summarizes the various steps that can be carried out by the method according to the invention so as to correct the reflectivity for a given pixel.

FIG. 6 summarizes the various steps that can be implemented by the method according to the invention for correcting the reflectivity for a given pixel.

Firstly, the reflectivity associated with the current pixel i is measured (step 600). The attenuation due to the cloud droplets (step 601), the attenuation due to dioxygen (step 602) and the attenuation due to water vapor (step 603) are estimated as explained above. Finally, these estimates are used for obtaining a corrected value $Z^{dBZ}$ of the measured reflectivity $Z_m^{dBZ}$ (step 604).

Thus, the invention advantageously enables the propagation attenuation of the microwaves emitted by a weather radar, for example on board an aircraft, to be corrected.

Figure 7A:
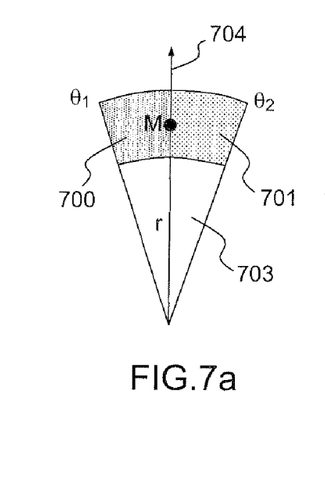
FIG. 7a illustrates the problem of reflectivity variability within a resolution volume.

FIG. 7a illustrates the problem of reflectivity variability within a resolution volume. The illustration is two-dimensional in order to simplify the representation.

As mentioned in the article by M. Gosset and I. Zawadzki entitled Effect of non-uniform beam filling on the propagation of the radar signal at X band frequencies, Part I: changes in the k(Z) relationship, Journal of Atmospheric and Oceanic Technology, vol. 18, pages 1113-1126, 2001, the non-uniformity of the reflectivity field has an influence on the attenuation correction through two types of effect. One is due to the variability in reflectivity and the other is due to the cumulative attenuation between the radar and the target.

Let us consider now a radar beam with a resolution volume $V_r$ at the distance r. The resolution volume is for example split into two portions 700, 701.

The first portion 700 is defined by a direction $\theta_1$ and the line of sight 704 of the radar. The reflectivity of this portion of the resolution volume is $Z_1(\theta_1, r)$.

The second portion 701 is defined by a direction $\theta_2$ and the line of sight 704 of the radar. The reflectivity of this portion of the resolution volume is $Z_2(\theta_2, r) \neq Z_1(\theta_1, r)$.

Corresponding to each of these portions is a specific attenuation due to precipitation, namely the respective expressions $a \times Z_1^b$ and $a \times Z_2^b$, for example, where a and b are real constants chosen such that a>0 and b≤1 depending on the weather conditions and the type of precipitation.

Figure 7B:
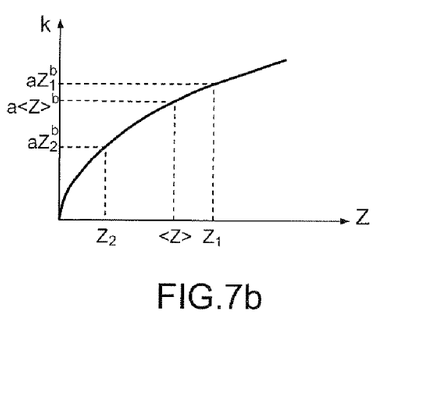
FIG. 7b illustrates the case in which the sum of the attenuations in a given resolution volume is greater than the specific attenuation calculated on the basis of an average value <Z>.

As illustrated in FIG. 7b, the sum of these attenuations is greater than the specific attenuation $a<Z>^b$, calculated from the average value $<Z>$ of $Z_1$ and $Z_2$, since the equation involved is non-linear.

Thus, the specific attenuation of this resolution volume is underestimated when taking the average value of its reflectivity. In other words, the averaging effect introduces a negative bias into the specific attenuation, which bias is also unobtainable by measurement since the measured value is a spatial average over the set of $V_r$ values. Of course, this bias is greater the more $Z_1$ differs from $Z_2$. The specific attenuation is therefore more greatly overestimated the larger the variability in reflectivity within the resolution volume. This is the case if the volume in question is for example bordering an intense hail-laden convective region in which the reflectivity may go from some 50-60 dBZ to 30 dBZ over 1 or 2 km.

Figure 8A:
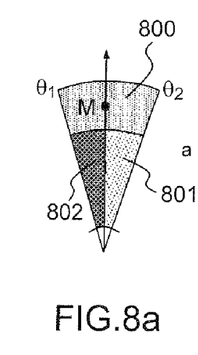
FIG. 8a illustrates an example in which the resolution volume has a uniform reflectivity Z and different cumulative attenuations along different paths.

FIG. 8a illustrates an example in which the resolution volume 800 has a uniform reflectivity Z and the cumulative attenuations along the paths defined by $\theta_1$ (802) and $\theta_2$ (801) are different.

Figures 8B, 8C:
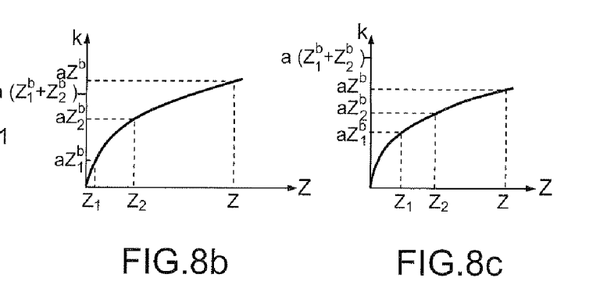
FIG. 8b illustrates the effect on the measured reflectivity of large and very different cumulative attenuations.
FIG. 8c illustrates the effect on the measured reflectivity of small and similar cumulative attenuations.

FIG. 8b shows that for large cumulative attenuations, one of the portions is much more attenuated than the other so that $Z_1 \ll Z_2$. The total specific attenuation $a \times Z_1^b + a \times Z_2^b$ may then be smaller than the actual specific attenuation $a \times Z^b$ obtained from the reflectivity Z that corresponds to the reflectivity for a uniform or zero cumulative attenuation. In this case, the attenuation is overestimated. This time the variability in the cumulative attenuation introduces a positive bias, again inaccessible thereto.

FIG. 8c illustrates the case in which the cumulative attenuations are small and similar, or if one of them is virtually zero. This is then the opposite situation; the bias is negative and the attenuation is underestimated.

To take into account the non-uniformity of the reflectivity within a resolution volume $V_r$, it is useful to know, at least partially, how the reflectivity varies within the volume. If, for example, FIG. 1 is examined, the structure of the field prevents any correction to the non-uniformity. This is because the reflectivity measurement for $V_r$ may result from a region in which there is, in the very region $V_r$, a clear separation between a portion having a high reflectivity and a portion having a low reflectivity, or from a region which is instead uniform, in which the reflectivity varies very little. The latter case may for example correspond to the convective or stratiform portion of a squall line. Since, in these extreme cases, the variations in reflectivity within $V_r$ are completely different, any attempt to obtain a precise correction is arbitrary and ineffective.

In contrast, the method according to the invention takes into consideration the variation in reflectivity within the resolution volume due to the separation marked by the T=0° C. isotherm. Except for hail-laden areas, this isotherm marks a separation between rain (T>0° C.) and snow (T<0° C.).

Figure 9:
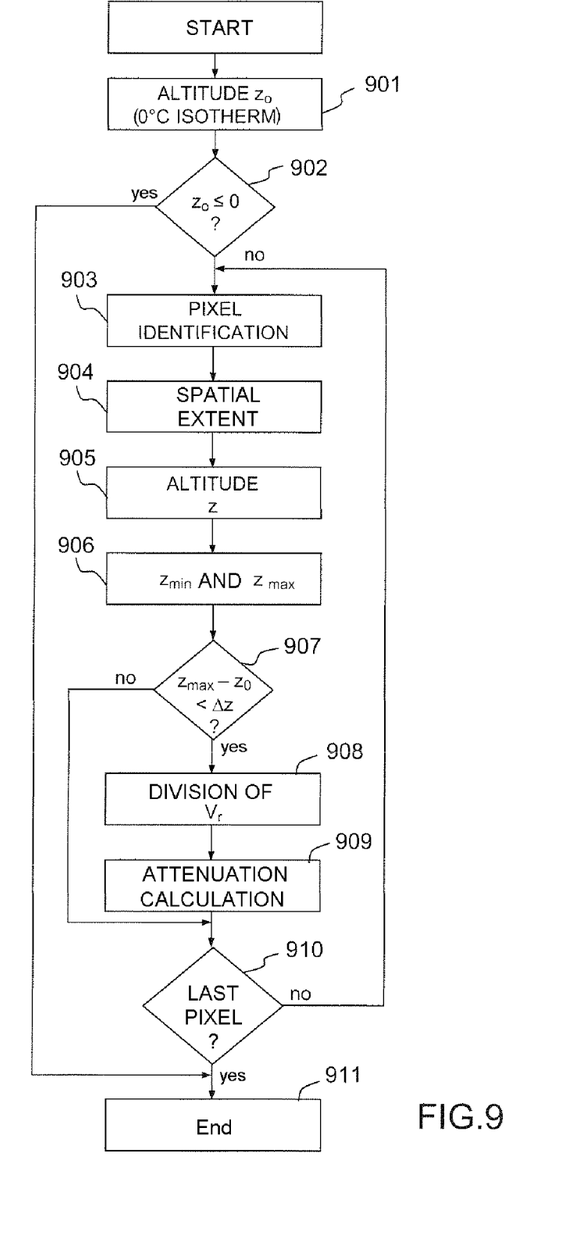
FIG. 9 gives an example of a method for correcting the reflectivity non-uniformity due to the 0° C. isotherm.

One example of the method for correcting the non-uniformity of the reflectivity due to the 0° C. isotherm is illustrated in FIG. 9.

Firstly, using the initially defined temperature profile, the altitude $z_0$ of the 0° C. isotherm is determined (step 901). If the altitude is negative or zero, the isotherm does not exist, which means that only snow is present in the resolution volume (there being no rain). In which case, there is no need to apply the other steps of the method.

If the altitude is positive (step 902), a pixel along the vertical corresponding to a resolution volume at a distance r and an elevation θ of the radar is isolated (step 903).

The spatial extent of this pixel is then determined (step 904) using for example the following equation:

$$\Delta z = r \times \tan(\theta_{3\,dB}) \tag{13}$$

in which $\theta_{3\,dB}$ is the 3 dB aperture, for example equal to 4°.

The minimum and maximum altitudes of the beam, denoted by $z_{min}$ and $z_{max}$ respectively, may be determined (step 906) using the following equations:

$$z_{min} = z - \Delta z/2 \tag{14}$$

$$z_{max} = z + \Delta z/2 \tag{15}$$

In equations (14) and (15), the altitude z, which is that corresponding to the central point M of the resolution volume associated with the isolated pixel, may be obtained (step 905) using the equation:

$$z = r \times \sin(\theta) + z_r + \frac{r^2}{2 \times R_T} \tag{16}$$

in which:

$z_r$ is the fixed altitude of the radar (for example 8 km); and the third term $r^2/(2 \times R_T)$ is due to the Earth's roundness, this being ascribed what is called a radioelectric radius $R_T$=8 490 km, enabling the atmospheric refraction to be taken into account.

The difference $z_{max} - z_0$ is then compared with $\Delta z$ (step 907). If $z_{max} - z_0 < \Delta z$, this means that the 0° C. isotherm passes through the resolution volume. The resolution volume is then split into two volume fractions (step 908). The volume fraction lying above the isotherm is given by:

$$\alpha = \frac{z_{max} - z_0}{z_{max} - z_{min}} \tag{17}$$

If the value of $z_{min}$ defined beforehand (step 906) is negative, it is forced to be 0 for the calculation of α.

The attenuation of the pixel is then determined (step 909). Rain attenuates the radar signal in the volume fraction lying beneath the isotherm. Moreover, snow attenuates the signal, to a lesser extent, above the isotherm.

The reflectivity $Z_m$ (expressed in mm$^6 \times$m$^{-3}$) of the pixel is considered to be partly due to that owing to rain as the proportion (1−α) and to that owing to snow as the proportion α. The attenuation is therefore given by:

$$k = a \times (1-\alpha)^b \times (Z_m)^b + a' \times \alpha \times (Z_m)^{b'} \tag{18}$$

in which expression a, b, a' and b' are real constants. To give an example, the following values may be chosen:

a=1.05×10$^4$;
b=0.811;
a'=1.396×10$^{-7}$;
b'=1.25.

If other pixels are to be processed (step 910) the previous steps are again applied. Otherwise, the execution of the method terminates (step 911).

The invention has the key advantage of taking into account the non-uniformity in the filling of a radar resolution volume owing to the presence in this volume of the 0° C. isotherm. This non-uniformity is itself, fundamentally, a component not detectable using reflectivity measurements.

The invention claimed is:

1. A method of correcting a reflectivity measurement performed by a weather radar, the reflectivity measurement being associated with a resolution volume, the method comprising:

analyzing the resolution volume to determine whether a plane representing the 0° C. isotherm passes through the resolution volume;

when the plane representing the 0° C. isotherm passes through the resolution volume, dividing said resolution volume into two portions lying on either side of said plane, and determining an attenuation associated with the resolution volume by taking into account the contribution of each of the portions to measured reflectivity; and correcting the reflectivity associated with the current resolution volume using the attenuation thus determined, wherein the weather radar performs the analyzing the current resolution volume, the dividing said resolution volume into the two portions, the determining the attenuation associated with the resolution volume, and the correcting the reflectivity associated with the current resolution volume.

2. The method according to claim 1, wherein an attenuation for precipitation is determined using the equation $$k = a \times (1-\alpha)^b \times (Z_m)^b + a' \times \alpha \times (Z_m)^{b'}$$

in which $Z_m$ represents the measured reflectivity of a resolution volume $V_r$ expressed in mm$^6 \times$m$^{-3}$, α represents the fraction of the resolution volume lying above the 0° C. isotherm, and a, b, a', b' are real constants to be chosen according to the weather conditions and the type of precipitation.

3. A weather radar onboard an aircraft, implementing the method according to claim 1.

* * * * *

UNITED STATES PATENT AND TRADEMARK OFFICE
CERTIFICATE OF CORRECTION

PATENT NO.        : 8,659,468 B2                                        Page 1 of 1
APPLICATION NO.   : 13/118697
DATED             : February 25, 2014
INVENTOR(S)       : Olivier Pujol et al.

It is certified that error appears in the above-identified patent and that said Letters Patent is hereby corrected as shown below:

On the title page of the patent item (75) Inventors

Please change Inventor Alia Iassamen's city from "Toulouse" to --Elancourt--.

Signed and Sealed this
Sixth Day of May, 2014

Michelle K. Lee
*Deputy Director of the United States Patent and Trademark Office*